(12) United States Patent
Remillard et al.

(10) Patent No.: US 9,809,152 B2
(45) Date of Patent: Nov. 7, 2017

(54) SMART LIGHT ASSEMBLY AND SMART LIGHTING SYSTEM FOR A MOTOR VEHICLE

(71) Applicant: FORD GLOBAL TECHNOLOGIES, LLC, Dearborn, MI (US)

(72) Inventors: Jeffrey Thomas Remillard, Ypsilanti, MI (US); Michael Bryan VanBelle, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 5 days.

(21) Appl. No.: 15/074,420

(22) Filed: Mar. 18, 2016

(65) Prior Publication Data
US 2017/0267162 A1 Sep. 21, 2017

(51) Int. Cl.
| | |
|---|---|
| B60Q 1/26 | (2006.01) |
| B60Q 1/08 | (2006.01) |
| F21S 8/10 | (2006.01) |
| F21V 23/00 | (2015.01) |
| B60Q 1/00 | (2006.01) |
| F21Y 115/10 | (2016.01) |

(52) U.S. Cl.
CPC ........... B60Q 1/085 (2013.01); B60Q 1/0023 (2013.01); F21S 48/115 (2013.01); F21V 23/003 (2013.01); F21Y 2115/10 (2016.08)

(58) Field of Classification Search
CPC ........ B60Q 1/44; B60Q 1/143; B60Q 1/1423; B60Q 9/001; B60Q 2300/112
USPC ............................................... 315/77–80, 82
See application file for complete search history.

(56) References Cited

U.S. PATENT DOCUMENTS

| | | | |
|---|---|---|---|
| 6,990,397 B2 | 1/2006 | Albou et al. | |
| 9,227,555 B2 | 1/2016 | Kalapodas | |
| 2004/0114921 A1* | 6/2004 | Braun | B60Q 9/008 |
| | | | 396/661 |
| 2005/0232469 A1* | 10/2005 | Schofield | G06K 9/00818 |
| | | | 382/104 |
| 2008/0084165 A1 | 4/2008 | Otsuka et al. | |
| 2009/0010494 A1* | 1/2009 | Bechtel | B60Q 1/1423 |
| | | | 382/104 |

FOREIGN PATENT DOCUMENTS

| | | |
|---|---|---|
| DE | 102015003688 A1 | 9/2015 |
| JP | 4730284 B2 | 7/2011 |
| KR | 101057649 B1 | 8/2011 |

OTHER PUBLICATIONS

English Machine Translation of DE102015003688A1.
English Machine Translation of JP4730284B2.
English Machine Translation of KR101057649B1.
Robert Tamburo, Eriko Nurvitadhi, Abhishek Chugh, Mei Chen, Anthony Rowe, Takeo Kanade, Srinivasa G. Narasimhan; "Programmable Automotive Headlights"; pp. 1-16.
Darko Juric; "On-road Night-time Vehicle Light Detection and Tracking Methods Overview"; pp. 1-9.

* cited by examiner

*Primary Examiner* — Minh D A
(74) *Attorney, Agent, or Firm* — Jason Rogers; King & Schickli, PLLC

(57) ABSTRACT

A smart light assembly is provided for a motor vehicle. That smart light assembly includes an electronic sensing device dedicated to the smart light assembly, an adjustable beam light source and a controller directly connected to the adjustable beam light source. A smart lighting system is also disclosed.

18 Claims, 2 Drawing Sheets

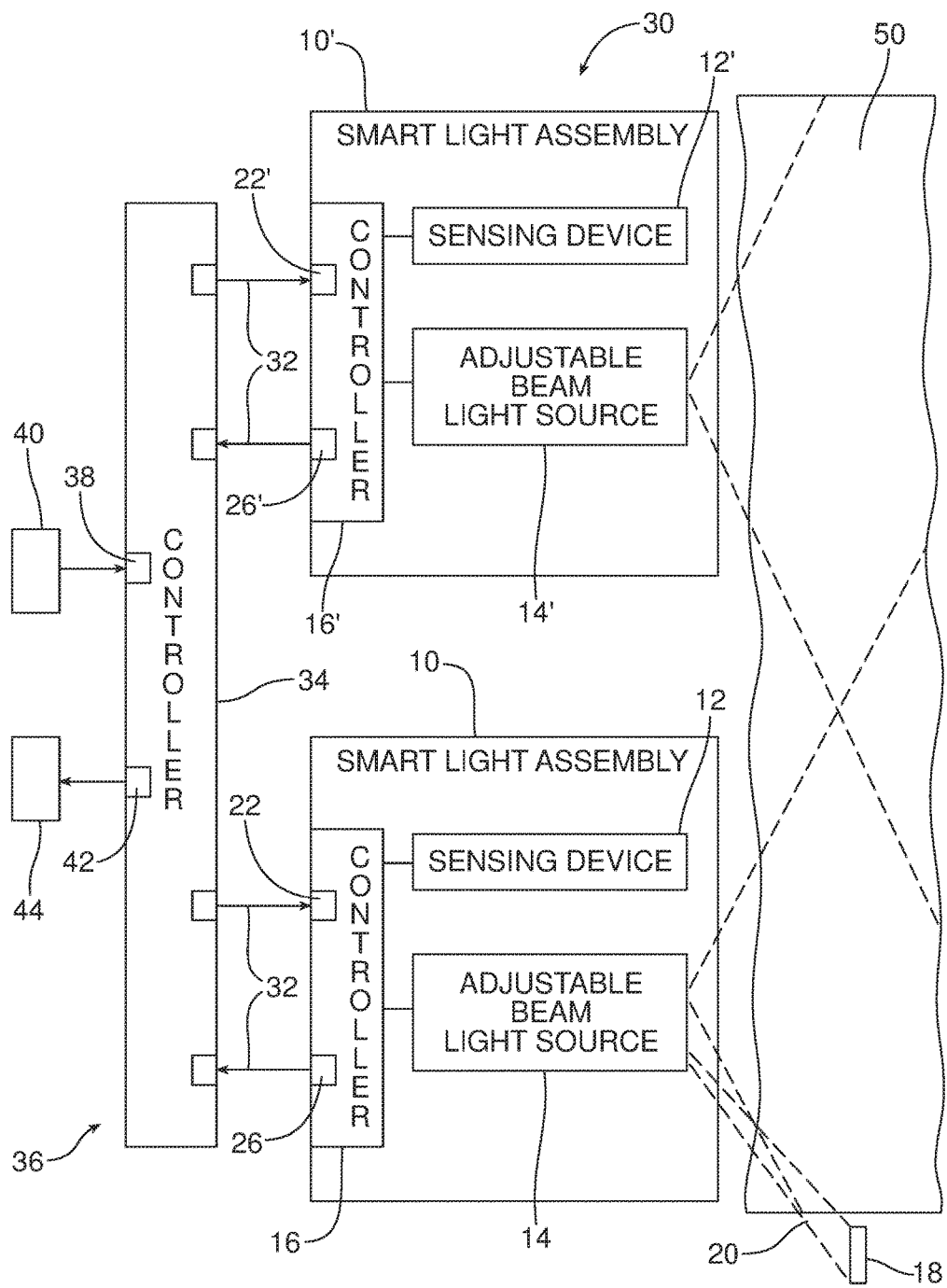

SMART LIGHT ASSEMBLY AND SMART LIGHTING SYSTEM FOR A MOTOR VEHICLE

TECHNICAL FIELD

This document relates generally to the motor vehicle equipment field and, more particularly, to a smart light assembly and a smart lighting system for a motor vehicle adapted to provide an improved field-of-view for a motor vehicle operator under various operating conditions.

BACKGROUND

A new and improved smart light assembly and smart lighting system, incorporating two or more smart light assemblies, are provided for a motor vehicle. The smart light assembly and smart light system rely upon dedicated cameras for the lighting function so that the choice of lens and imager may be optimized for lighting applications. Further, by directly connecting the dedicated processor to the adjustable beam headlamp, any latency between the imaging and processing of the scene data is minimized, allowing the assembly to respond quickly to the presence of an oncoming car, pedestrian, a road sign or other target of interest.

SUMMARY

In accordance with the purposes and benefits described herein, a smart light assembly is provided for a motor vehicle. That smart light assembly comprises an electronic sensing device dedicated to the smart light assembly, an adjustable beam light source and a controller directly connected to the adjustable beam light source. That controller may be configured to: (a) receive data from the electronic sensing device, (b) identify a target of interest, such as a road sign, from the data and (c) direct illumination from the adjustable beam light source onto the identified target or road sign. Still further, the controller may be further configured to receive data from the electronic sensing device, identify a pedestrian from the data and direct illumination from the adjustable beam light source onto the identified pedestrian The electronic sensing device may be selected from a group of sensing devices consisting of a photo sensing device, a camera, an infrared sensor, a color image sensor, a thermal imaging device, a radar device, a sonar device, and combinations thereof. The adjustable beam light source may be a headlamp of the motor vehicle. Still further, the controller may be configured to include a data input respecting at least one parameter selected from a group consisting of motor vehicle speed, motor vehicle acceleration and motor vehicle location. Still further, the controller may be configured to receive data from a motor vehicle speed monitoring device, a motor vehicle acceleration monitoring device and a motor vehicle location monitoring device and direct illumination from the adjustable beam light source so as to follow a roadway upon which the motor vehicle is being operated.

In accordance with an additional aspect, a smart lighting system is provided for a motor vehicle. That smart lighting system comprises (a) a first smart light assembly including a first, dedicated electronic sensing device and a first adjustable beam light source, and (b) a second smart lighting assembly including a second, dedicated electronic sensing device and a second adjustable beam light source. Further, the smart lighting system includes a control module directly connected to the first, dedicated electronic sensing device, the first adjustable beam light source, the second dedicated electronic sensing device and the second adjustable beam light source. That control module may be configured to receive data from the first dedicated sensing device and the second dedicated sensing device and determine a distance from the motor vehicle to an identified object based upon data received from the first and second dedicated electronic sensing devices.

Still further, the control module may be configured to receive data from the first and second dedicated sensing devices, identify a road sign from that data and direct illumination from at least one of the first adjustable beam light sources and the second adjustable beam light source onto the identified road sign.

The control module may further include a first dedicated controller in the first smart light assembly and a second, dedicated controller in the second smart light assembly. Further, the control module may be configured to include a data input respecting at least one parameter selected from a group consisting of motor vehicle speed, motor vehicle acceleration and motor vehicle location. Still further, the control module may be further configured to receive data from a motor vehicle speed monitoring device, a motor vehicle acceleration monitoring device and a motor vehicle location monitoring device and direct illumination from at least one of the first and second adjustable beam light sources so as to follow a roadway upon which the motor vehicle is being operated.

In accordance with yet another aspect, a method is provided for improving visibility of a road sign to an operator of a motor vehicle. That method comprises the steps of (a) detecting, by a first sensing device, objects along a roadway, (b) identifying, by a control module, the road sign among the detected objects and (c) directing, by the control module, illumination from an adjustable beam light source onto the road sign as the motor vehicle approaches the road sign.

The method may further include the step of identifying, by the control module, a pedestrian among the detected objects. In addition, the method may include the step of directing, by the control module, illumination from the adjustable beam light source onto the pedestrian as the motor vehicle approaches the pedestrian.

Still further, the method may include the steps of identifying, by the control module a path of the roadway among the detected objects and directing, by the control module, illumination from the adjustable beam light source to follow that path.

Still further, the method may include the step of detecting, by a second sensing device, objects along the roadway. Further, the method may include the step of determining, by the control module, a distance from the motor vehicle to the detected objects, based upon data received by the control module from the first and second sensing devices.

In the following description, there are shown and described several preferred embodiments of the smart light assembly and smart lighting system for a motor vehicle. As it should be realized, the assembly and system are capable of other, different embodiments and their several details are capable of modification in various, obvious aspects all without departing from the assembly and system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the smart light assembly and smart lighting system and together with the description serve to explain certain principles thereof. In the drawing figures:

FIG. 2 is a schematic block diagram of the smart lighting system incorporating two smart light assemblies of the type illustrated in FIG. 1.

Figure 1:
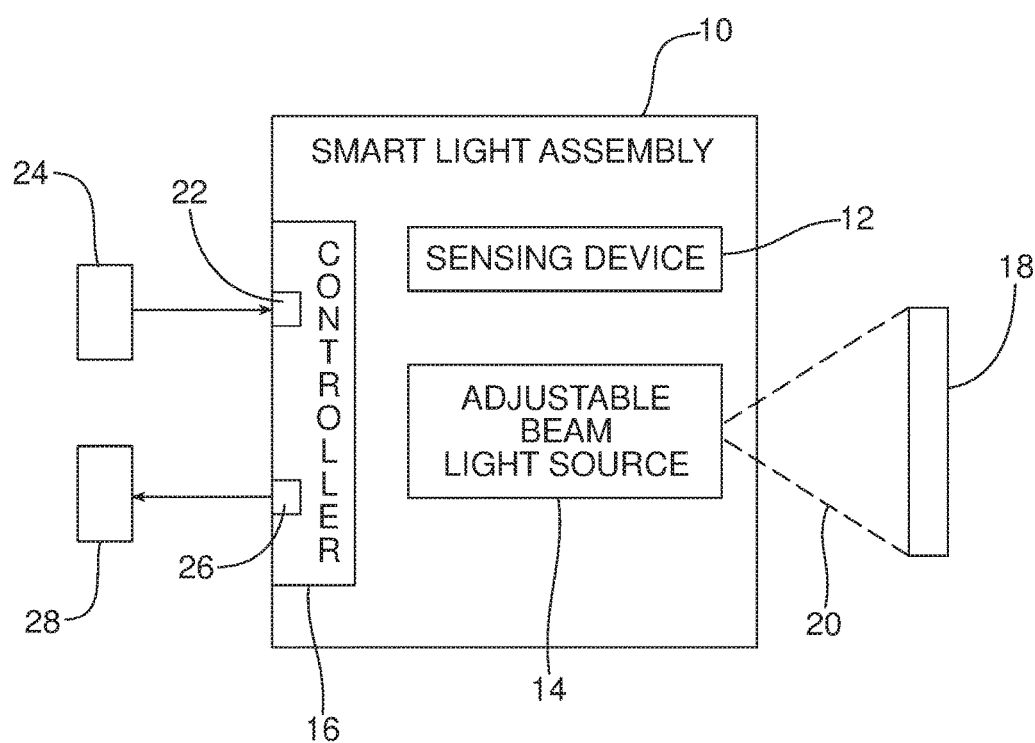
FIG. 1 is a schematic block diagram of the smart light assembly.

Reference will now be made in detail to the present preferred embodiments of the smart light assembly and smart lighting system, examples of which are illustrated in the accompanying drawing figures.

DETAILED DESCRIPTION

Reference is now made to FIG. 1 illustrating a smart light assembly 10. That smart light assembly 10 includes an electronic sensing device 12, an adjustable beam light source 14 and a controller 16. The electronic sensing device 12 may comprise a photo sensing device, a camera, an infrared sensor, a color image sensor, a thermal imaging device, a radar device, a sonar device, and combinations thereof appropriate for use in (a) detecting objects along a roadway during motor vehicle operation and (b) providing data with respect to those objects to the controller 16.

The controller 16 may comprise a dedicated microprocessor or an electronic control unit (ECU) operating in accordance with appropriate control software. Thus, it should be appreciated that the controller 16 may comprise one or more processors, one or more memories and one or more network interfaces all in communication with each other over a communication bus.

The adjustable beam light source 14 is capable of producing an adjustable beam pattern. Such an adjustable beam light source may, for example, comprise a headlamp in the form of a digital light projection (DLP) device with suitable projection optics, whereby a dark region may be created at any location within the beam pattern. Alternatively, the adjustable beam light source 14 may utilize a matrix of LEDs and suitable projection optics allowing different sections or targets in the field of view to be illuminated by turning on and off different LEDs or groups of LEDs.

In the illustrated embodiment, the electronic sensing device 12 and the controller 16 are both dedicated to the smart light assembly 10. Accordingly, the electronic sensing device 12 may be optimized for lighting applications. For example, when the electronic sensing device 12 is a camera, the choice of lens and imager may be optimized for use with the smart light assembly 10 to provide an adjustable beam that illuminates target objects in a field of view in a desired manner based upon instructions received from the controller 16.

More specifically, the electronic sensing device 12 is directly connected to the controller 16 that analyzes the image and sends demands to the adjustable beam light source 14 thereby controlling the lamp beam pattern. Because the controller 16 is directly connected to the adjustable beam headlight source 14, the latency between imaging and processing the scene data is minimized, allowing the smart light assembly 10 to respond more quickly to the presence of any particular target of interest including, for example, an oncoming car, a pedestrian, a road sign or the like. Since the controller 16 is designed solely for the purpose of implementing this lighting function, the processor speed, memory and other performance characteristics may be optimized for this purpose.

For example, in one possible embodiment of the invention, the controller 16 is configured to receive data from the electronic sensing device 12, identify a particular target of interest such as a road sign 18 from that data and direct at least a part of the illumination from the adjustable beam light source 14 onto the identified road sign.

Similarly, the controller 16 may be configured to receive data from the electronic sensing device 12, identify a pedestrian from that data and direct at least a part of the illumination from the adjustable beam light source 14 onto the identified pedestrian.

Still further, the controller 16 may be configured to include a data input 22 respecting at least one parameter selected from a group consisting of motor vehicle speed, motor vehicle acceleration and motor vehicle location. In such an embodiment, the controller 16 may be further configured to receive data from a motor vehicle speed monitoring device, a motor vehicle acceleration monitoring device and a motor vehicle location monitoring device, identified collectively in drawing FIG. 1 by reference number 24, and then direct illumination from the adjustable beam light source 14 to follow a roadway upon which the motor vehicle is being operated.

As further illustrated in FIG. 1, the controller 16 may also be configured to include a data output 24 to share information with another control module such as the body control module (BCM) 28 of the motor vehicle. The BCM 28 performs a number of interior body electrically based functions including, for example, interior locking, remote key entry, interior light, exterior light, windshield wiper control and the like. In some embodiments, the BCM 28 may also function to control entertainment functions (e.g. radio, CD player and communications such as telephone and internet communications over a wireless network). In some embodiments the BCM 28 is connected by a communication bus (not shown) to other control modules that provide one or more of the additional functions.

Reference is now made to FIG. 2 illustrating a smart lighting system 30 which generally comprises two smart light assemblies 10, 10' of the type described above. In the illustrated embodiment, the controllers 16, 16' of the two smart light assemblies 10, 10' are connected via data signal lines 32 to a principle controller 34 and, together the three controllers 16, 16' and 34 comprise the control module 36 of the smart lighting system 30. In other embodiments, the two controllers 16, 16' may be interconnected and the controller 34 may be omitted. In still other embodiments, a single controller 16 would operate both smart light assemblies 10, 10' and comprise the entire control module 36.

As illustrated in FIG. 2, the smart lighting system 30 includes the first smart light assembly 10 having a first, dedicated electronic sensing device 12 and a first adjustable beam light source 14 as well as a second smart lighting assembly 10' including a second, dedicated electronic sensing device 12' and a second adjustable beam light source 14'. The control module 36 is directly connected to the first and second dedicated electronic sensing devices 12, 12' and the first and second adjustable beam light sources 14, 14'.

In such an embodiment, the control module 36 may be configured to receive data from the first and second dedicated sensing devices 12, 12' and use stereo vision algorithms to determine a distance from the motor vehicle to an identified object 18 based upon data received from the first and second electronic sensing devices. In one possible embodiment, the target object 18 is a road sign and the control module 36 may be operative to direct at least some illumination 20 from the adjustable beam light source 14 upon the identified road sign.

In the embodiment illustrated in FIG. 2, the control module 36 includes data signal lines 42 between the controllers 34, 16 and 16'. In addition, the controller 36 includes a data input 38 that receives data from a motor vehicle speed monitoring device, a motor vehicle acceleration monitoring device and a motor vehicle location monitoring device, collectively illustrated at box 40 in FIG. 2. Further, the control module 36 is configured to then direct illumination from at least one of the adjustable beam light sources 14, 14' so as to follow the roadway 50 upon which the motor vehicle is being operated. In the illustrated embodiment, illumination is being directed upon the roadway by both adjustable beam light sources 14, 14'.

As further illustrated in FIG. 2, the controller 34 of the control module 36 is also configured to determine the distance to objects such as the road sign 18 by using a stereo vision algorithm to process the data provided by the two sensing devices 12, 12'. That data may also be provided through the data output 40 to the BCM 28. Such information may be useful to the active safety system of the motor vehicle when, for example, the target object is a potential safety hazard such as a stopped vehicle in the roadway.

As should be appreciated, a method is also provided for improving the visibility of a road sign 18 to an operator of a motor vehicle. That method may be described as including the steps of: (a) detecting, by a first sensing device 12, objects along a roadway 50, (b) identifying, by a control module 16, the road sign 18 among the detected objects and (c) directing, by the control module, illumination from an adjustable beam light source 14 onto the road sign 18 as the motor vehicle approaches the road sign.

The method may further include the step of identifying, by the control module 16, a pedestrian among the detected objects and directing, by the control module illumination from the adjustable beam light source 14 onto the pedestrian as the motor vehicle approaches the pedestrian. Further, the method may include identifying, by the control module 36, a path of the roadway 50 among the detected objects and directing, by the control module, illumination from the adjustable beam light source 14, 14' onto the path of the roadway.

In addition, the method may include the step of detecting, by a second sensing device 14', objects along the roadway and determining, by the control module 36 the distance from the motor vehicle to the detected objects based upon data received by the control module from first and second sensing devices 12, 12'.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed is:

1. A smart light assembly for a motor vehicle, comprising:
   an electronic sensing device dedicated to said smart light assembly;
   an adjustable beam light source; and
   a controller directly connected to said adjustable beam light source, wherein said controller is configured to receive data from a motor vehicle speed monitoring device, a motor vehicle acceleration monitoring device and a motor vehicle location monitoring device, and direct illumination from said adjustable beam light source so as to follow a roadway upon which said motor vehicle is being operated.

2. The smart light assembly of claim 1, wherein said controller is further configured to receive data from said electronic sensing device, identify a road sign from said data and direct illumination from said adjustable beam light source onto said identified road sign.

3. The smart light assembly of claim 1, wherein said electronic sensing device is selected from a group of sensing devices consisting of a photo sensing device, a camera, an infrared sensor and combinations thereof.

4. The smart light assembly of claim 1, wherein said adjustable beam light source is a headlamp of said motor vehicle.

5. The smart light assembly of claim 1, wherein said controller is further configured to include a data input respecting at least one parameter selected from a group consisting of motor vehicle speed, motor vehicle acceleration and motor vehicle location.

6. The smart light assembly of claim 5, wherein said electronic sensing device is selected from a group of sensing devices consisting of a photo sensing device, a camera, an infrared sensor and combinations thereof.

7. The smart light assembly of claim 6, wherein said controller is further configured to receive data from said electronic sensing device, identify a road sign from said data and direct illumination from said adjustable beam light source onto said identified sign.

8. The smart light assembly of claim 7, wherein said controller is further configured to receive data from said electronic sensing device, identify a pedestrian from said data and direct illumination from said adjustable beam light source onto said identified pedestrian.

9. A smart lighting system for a motor vehicle, comprising:
   a first smart light assembly including a first, dedicated electronic sensing device and a first adjustable beam light source;
   a second smart lighting assembly including a second dedicated, electronic sensing device and a second adjustable beam light source; and
   a control module directly connected to said first dedicated electronic sensing device, said first adjustable beam light source, said second dedicated electronic sensing device and said second adjustable beam light source, wherein said control module is configured to include a data input respecting a plurality of parameters selected from a group consisting of motor vehicle speed, motor vehicle acceleration and motor vehicle location.

10. The smart lighting system of claim 9, wherein said control module is further configured to receive data from said first dedicated sensing device and said second dedicated sensing device and determine a distance from said motor vehicle to an identified object based upon data received from said first dedicated electronic sensing device and said second dedicated electronic sensing device.

11. The smart lighting system of claim 10, wherein said control module is further configured to receive data from said first dedicated sensing device and said second dedicated sensing device, identify a road sign from said data and direct illumination from at least one of said first adjustable beam light source and said second adjustable beam light source onto said identified road sign.

12. The smart lighting system of claim 11, wherein said control module includes a first dedicated controller in said first smart light assembly and a second dedicated controller in said second smart light assembly.

13. The smart lighting system of claim 12, wherein said control module is further configured to receive data from a motor vehicle speed monitoring device, a motor vehicle acceleration monitoring device and a motor vehicle location monitoring device and direct illumination from at least one of said first adjustable beam light source and said second adjustable beam light source so as to follow a roadway upon which said motor vehicle is being operated.

14. A method of improving visibility of a road sign to an operator of a motor vehicle, comprising:
   detecting, by a first sensing device, objects along a roadway;
   identifying, by a control module, said road sign among said detected objects;
   directing, by said control module, illumination from an adjustable beam light source onto said road sign as said motor vehicle approaches said road sign;
   receiving, by said control module, data from a motor vehicle speed monitoring device, a motor vehicle acceleration monitoring device and a motor vehicle location monitoring device; and
   directing, by said control module, illumination from said adjustable beam light source so as to follow a roadway upon which said motor vehicle is being operated.

15. The method of claim 14, further including identifying, by said control module, a pedestrian among said detected objects and directing, by said control module, illumination from said adjustable beam light source onto said pedestrian as said motor vehicle approaches said pedestrian.

16. The method of claim 15, further including identifying, by said control module, a path of said roadway among said detected objects and directing, by said control module, illumination from said adjustable beam light source to follow said path.

17. The method of claim 16, further including detecting, by a second sensing device, said objects along said roadway.

18. The method of claim 17, further including determining, by said control module, a distance from said motor vehicle to said detected objects, based upon data received by said control module from said first sensing device and said second sensing device.

* * * * *